United States Patent [19]
Eguchi

[11] Patent Number: 5,465,130
[45] Date of Patent: Nov. 7, 1995

[54] FOCUS LIMITER

[75] Inventor: Haruki Eguchi, Tokyo, Japan

[73] Assignee: Asahi Kogaku Kogyo Kabushiki Kaisha, Tokyo, Japan

[21] Appl. No.: 20,845

[22] Filed: Jan. 29, 1993

[30] Foreign Application Priority Data

Jan. 30, 1992 [JP] Japan ........................ 4-040352

[51] Int. Cl.$^6$ ........................ G03B 1/18
[52] U.S. Cl. ........................ 354/195.1; 354/195.13; 354/199; 354/286; 354/289.11; 354/289.12
[58] Field of Search ............... 354/195.1, 195.13, 354/199, 286, 289.11, 289.12

[56] References Cited

U.S. PATENT DOCUMENTS

| | | | |
|---|---|---|---|
| 2,896,524 | 7/1959 | Warzybok et al. | 354/289.11 |
| 4,210,387 | 7/1980 | Ogawa. | |
| 4,855,782 | 8/1989 | Kobayashi et al.. | |
| 4,864,344 | 9/1989 | Arakawa et al. | 354/195.1 |
| 4,949,087 | 8/1990 | Miyazawa | 354/289.11 |
| 4,967,218 | 10/1990 | Numako et al.. | |
| 4,994,843 | 2/1991 | Kitazawa. | |
| 5,142,314 | 8/1992 | Ogawa. | |
| 5,172,149 | 12/1992 | Sekiguchi et al. | 354/195.12 |
| 5,204,715 | 4/1993 | Nakanishi et al. | 354/289.11 |
| 5,231,437 | 7/1993 | Kashiyama et al. | 354/195.1 |

FOREIGN PATENT DOCUMENTS

| | | |
|---|---|---|
| 0364137 | 4/1990 | European Pat. Off.. |
| 2242034 | 9/1991 | United Kingdom. |

Primary Examiner—Monroe H. Hayes
Attorney, Agent, or Firm—Sandler, Greenblum & Bernstein

[57] ABSTRACT

In a camera having a lens unit and a viewfinder, a power focus limiter is provided which is capable of narrowing the focusing range by using a driving motor. The device consists of an actuator, a motor control circuit, a driving motor and a detecting sensor, and a display device that provides a visual reference of the focusing range presently set to the operator. The system allows the focusing range to narrow quickly, while at the same time the operator can confirm whether the focusing range is in the desired range without moving his eye from the viewfinder.

4 Claims, 8 Drawing Sheets

FOCUS LIMITER

BACKGROUND OF THE INVENTION

This invention relates to a focus limiter employed in a lens unit of a camera.

Conventional lens units, for example, telephoto lens units which are suitable for auto-focus, have a focus limiter in order to shorten the focusing time. The focus limiter is arranged such that the position of a focus limiter ring is manually rotatably changeable so as to narrow the focusing range to a range which the operator desires.

However, in such a conventional focus limiter, the operator has to manually rotate the focus limiter ring which is coupled to the distal end of the outer peripherary of the lens unit. Accordingly, the focusing range cannot quickly be narrowed because the focus limiter ring is remote from the camera body. Therefore, the operator will have trouble, doing this operation.

Further, since the operator must visually confirm whether the focus limiter ring is at the desired position, the operator must move his eye from the camera viewfinder, possibly missing a photographic opportunity.

SUMMARY OF THE INVENTION

It is therefore an object of the present invention to provide an improved lens unit and an improved camera capable of narrowing the focusing range without the above defects.

For the above purpose, according to one aspect of the present invention, there is provided a lens unit including, a focus ring for moving a focus lens along an optical axis upon rotation of the focus ring about the optical axis within a predetermined focusing range defined between a near end and a far end, and a focus limiting device for narrowing the focusing range. The focus limiting device includes a focus limiting member to which the focus ring contacts thereby stopping the rotation thereof, a driving source for moving the focus limiting member, and an actuating device for actuating the driving source to move the focus limiting member.

In one aspect of the present invention, the focusing range can be narrowed quickly, and the disruption caused by this operation to the operator can be diminished.

According to another aspect of the present invention, there is provided a camera including a camera body, and a lens unit including a focus ring for moving a focus lens in an optical direction within a focusing range defined between a near end and a far end. The camera further includes a power focus limiting device for narrowing the focusing range by using a power force, detection device for detecting the present focusing range, and a display device for displaying the present focusing range detected by the detection device.

In another aspect of the present invention, the operator can confirm the focusing range set presently without moving his eye from the viewfinder. Thus, this can prevent the operator from missing a photographic opportunity.

DESCRIPTIONS OF ACCOMPANYING DRAWINGS

DESCRIPTION OF EMBODIMENTS

Preferred embodiments of the present invention will now be described hereinafter with reference to the drawings.

Figure 1:
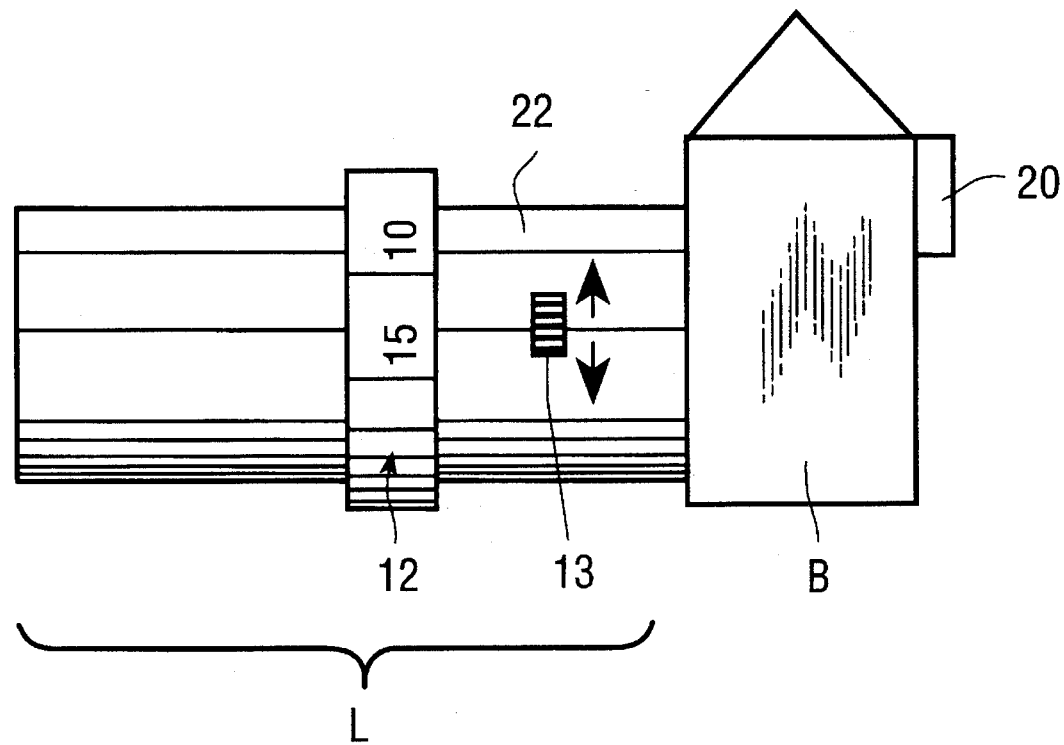
FIG. 1 is a schematic side view illustrating a camera embodying the present invention.
Figure 2:
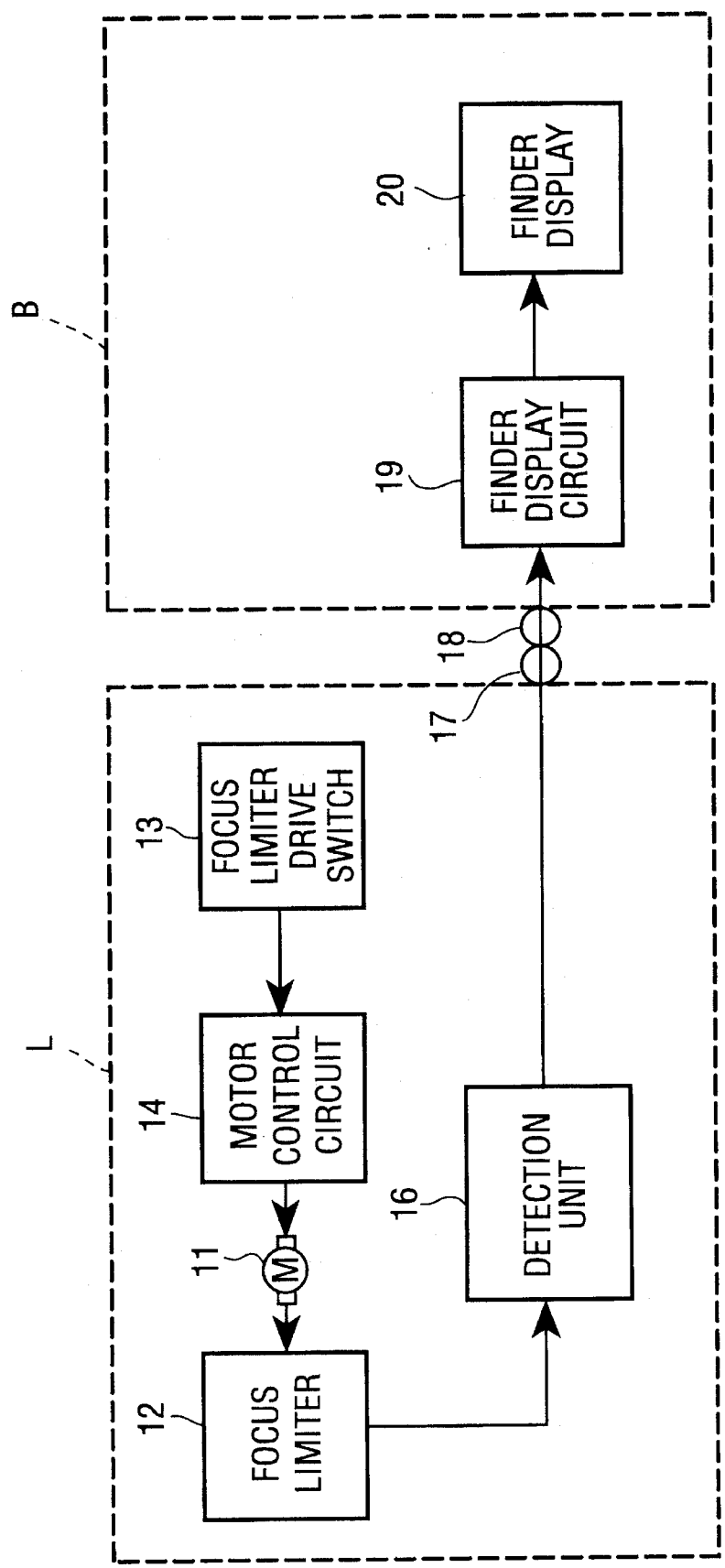
FIG. 2 is a system diagram embodying the present invention.

FIG. 1 illustrates a single lens reflex camera according to one embodiment of the present invention. FIG. 2 shows the electrical constitution of the camera illustrated in FIG. 1. The illustrated camera comprises a camera body B and a lens unit L, detachably mounted to the camera body B. The camera body B and the lens unit L are electrically connected to each other through electrical contacts 17 and 18 (see FIG. 2) provided on the camera body B and the lens unit L, respectively.

FOCUSING LENS DRIVING DEVICE

Figure 3:
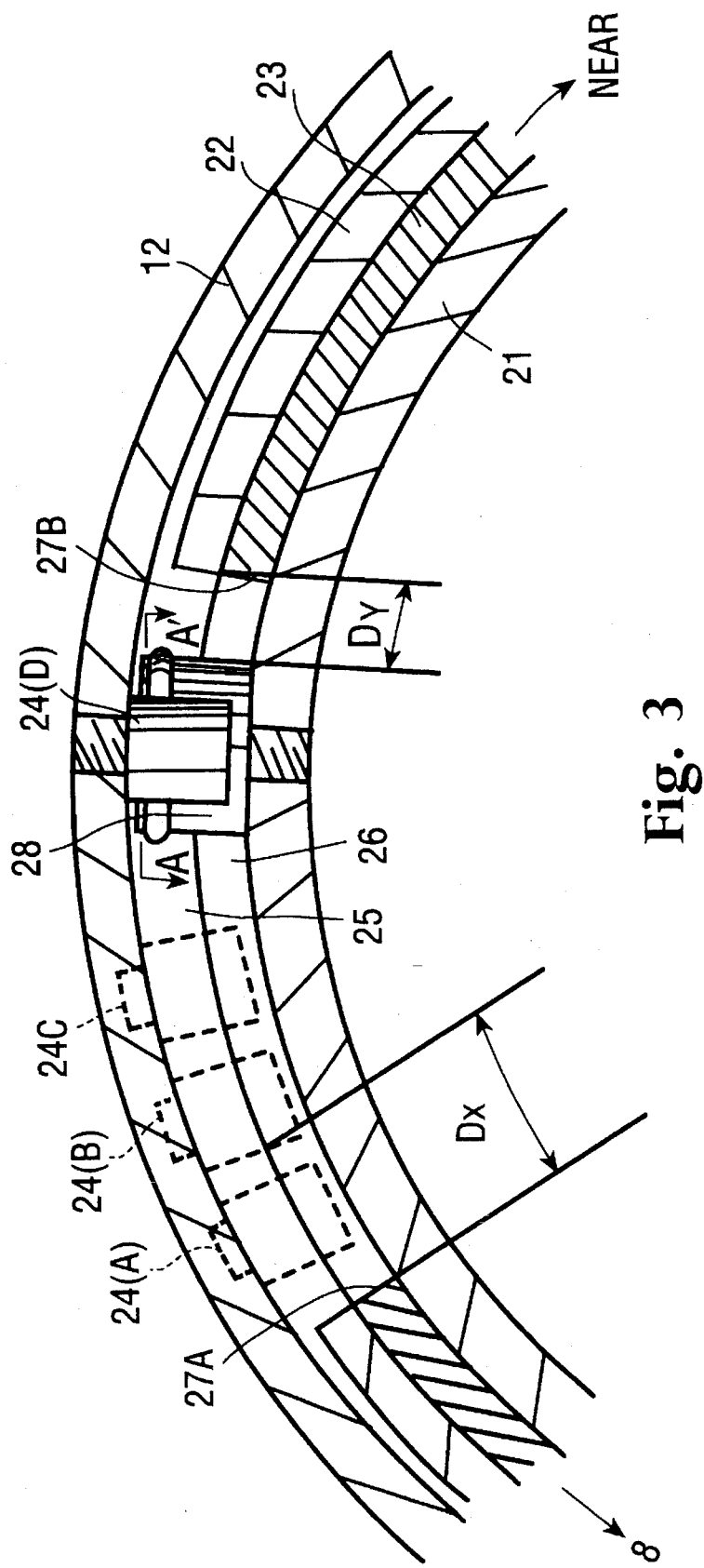
FIG. 3 is a partial sectional view illustrating the construction of a lens unit embodying the present invention, along a plane perpendicular to its optical axis.
Figure 4:
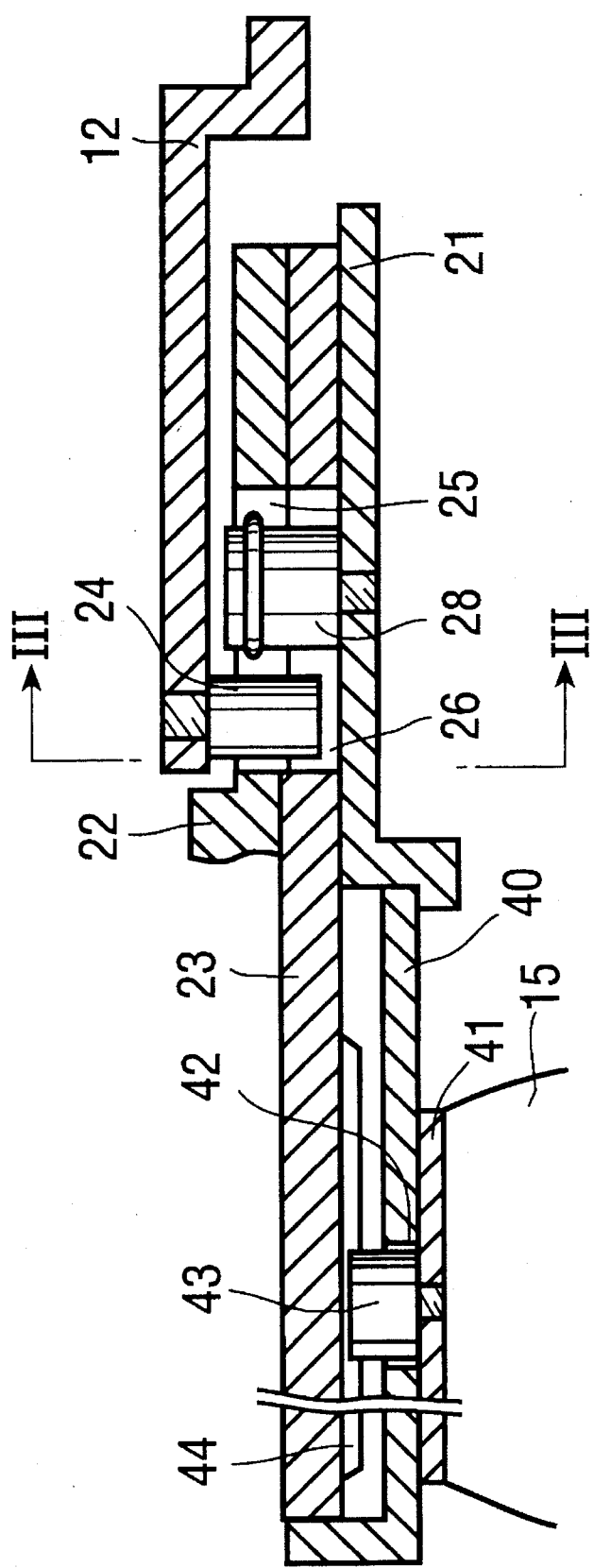
FIG. 4 is a partial sectional view illustrating the construction of the lens unit embodying the present invention, along a plane containing its optical axis.

As shown in FIGS. 3 and 4, the lens unit L includes an inner stationary ring 21, an outer stationary ring 22, and a lens driving ring 23 as a focus ring. The lens driving ring 23 is coaxially and rotatably mounted between the inner and outer stationary rings 21 and 22. A lens supporting ring 40 is secured at the distal end of the inner stationary ring 21 as shown in FIG. 4. A focusing lens group 15 is circumferentially supported by a lens frame 41, and a pin 43 is secured at the outer circumferential surface of the lens frame 41. A lead groove 42, extending in a direction inclined with respect to the optical axial direction, is formed on the lens supporting ring 40.

The pin 43 is slidably interfitted with a longitudinal guide protrusion 44 provided on the inner surface of the lens driving ring 23 and extending in the optical direction. The pin 43 is guided by a lead groove 42 during rotation of the lens driving ring 23. Accordingly, the focusing lens group 15 can be moved in the optical axis in accordance with the rotation of the lens driving ring 23.

DEVICE FOR DETERMINING FULL-EXTENT OF FOCUSING RANGE

FIGS. 3 and 4 show a mechanism for determining the full-extent of the focusing range. A square cut-off portion 25 is formed on the peripheral surface of the outer stationary ring 22, and a square cut-off portion 26 is formed on the peripheral surface of the lens driving ring 23, both extending in the circumferential direction. The cut-off portions 25 and 26 are set to be communicating with each other.

A pin 28 is planted on the outer circumferential surface of the inner stationary ring 21, and inserted into the square cut-off portions 25 and 26. In FIG. 3, when the lens driving ring 23 is rotated counterclockwise, one side edge (ie., face 27B) of the cut-off portion 26 comes to contact the periphery of the pin 28, causing the counterclockwise rotary movement of the lens driving ring 23 to be intercepted. Similarly, when the lens driving ring 23 is rotated clockwise, the other side edge (ie., face 27A) of the cut-off portion 26 comes to contact the periphery of the pin 28, causing the clockwise rotary movement of the lens driving ring 23 to be intercepted.

Thus, the full-extent of focusing range is determined by the pin 28.

FOCUS LIMITING DEVICE

FIG. 1 shows a focus limiter ring 12 mounted on the outer stationary ring 22 and rotated about the optical axis.

Figure 5:
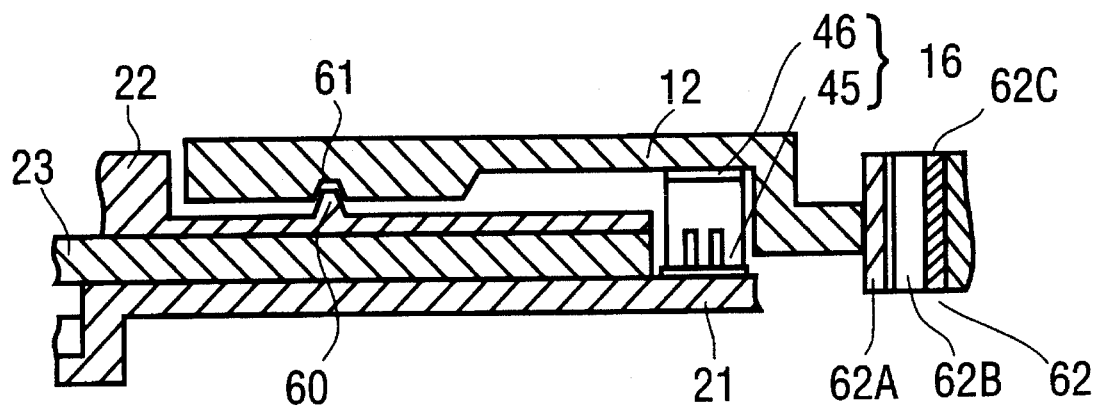
FIG. 5 is a partial sectional view illustrating the construction of a lens unit including a drive device and a detection unit in a plane containing its optical axis.

FIG. 5 shows a construction of a supporting device for rotatably supporting the focus limiter ring 12 on the outer stationary ring 22. A circumferential groove 61 is formed on the inner circumferential surface of the focus limiter ring 12 and extends in the circumferential direction. A protrusion 60 is formed on the outer circumferential surface of the outer stationary ring 22 and extends in the circumferential direction. The protrusion 60 is slidably interfitted with the circumferential groove 61.

Figure 7:
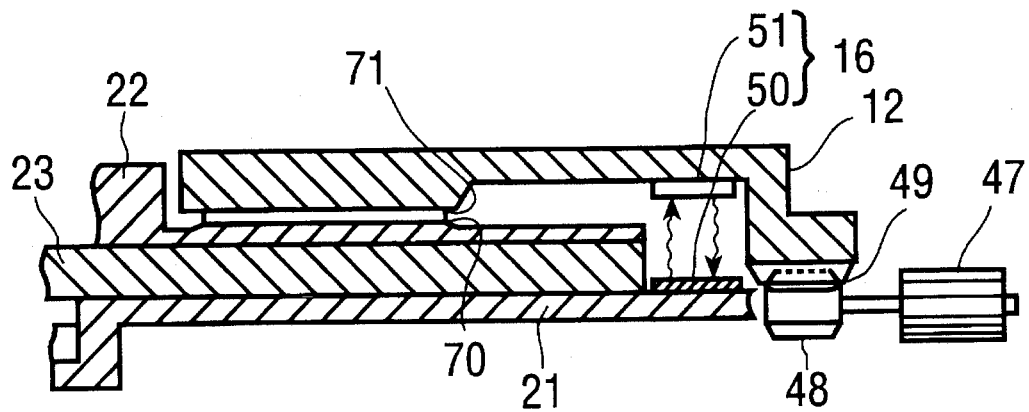
FIG. 7 is a partial sectional view illustrating the construction of a lens unit including an another drive device and another detection unit, in a plane containing its optical axis.

FIG. 7 shows another construction of the supporting device. A fine threaded male screw 70 is formed on the outer circumferential surface of the outer stationary ring 22. A fine threaded female screw 71 is formed on the inner circumferential surface of the focus limiter ring 12. The fine threaded male screw 70 is meshed with the fine threaded female screw 71.

As shown in FIG. 3, a pin 24 is planted on the inner surface of the focus limiter ring 12. The pin 24 is also inserted into the cut-off portions 25 and 26 along with the pin 28. In accordance with the rotation of the focus limiter ring 12, the pin 24 moves in the circumferential direction, but its movement is restricted to inside the cut-off portions 25 and 26.

When the pin 24 is located at position 24(D), it is directly in front of the pin 28 (in the optical axis direction, ie, the just left of the pin 28, as shown in FIG. 4), or aligned to the pin 28 with respect to the optical axis. Accordingly, the full-extent of focusing range is determined by the pin 28 and the pin 24 located at position 24(D), therefore, the focusing range will not be narrowed.

When the pin 24 is located at a position between the other side edge (i.e. face 27A) of the cut-off portion 26 and the pin 28, the focusing range will be narrowed in accordance with the position of the pin 24 relative to that of the pin 28. If, for example, pin 24 is located at position 24(B), as shown in FIG. 3, the rotary movement of the lens driving ring 23 is limited as follows: The other side edge 27A comes to contact the periphery of the pin 24 at a position 24B. The terminal end 27B will contact the periphery of the pin 28. Therefore, the rotatable range of the lens driving ring 23 will have been reduced to the distance Dx+Dy. In a similar manner, locating pin 24 at positions 24(A) and 24(C) will also reduce the rotatable range of the lens driving ring 23, but by respective different amounts.

It should be noted that the focusing range is related to the rotatable range of the lens driving ring 23. For pin 24 at position 24(A), the focusing range is, for example, between infinity and twelve meters, and for pin 24 at position 24(B) the focusing range is, for example, between infinity and ten meters. For pin 24 at position 24(C) the focusing range is, for example, between infinity and five meters.

ACTUATING DEVICE

Figure 11:
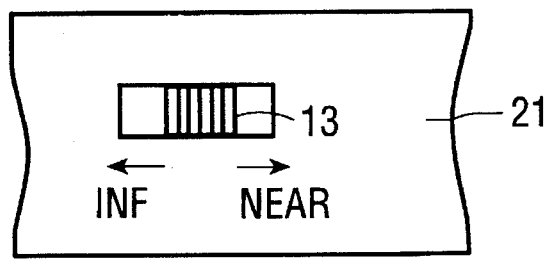
FIG. 11 is a developed view of the focus limiter drive switch, as shown in FIG. 1.
Figure 12:
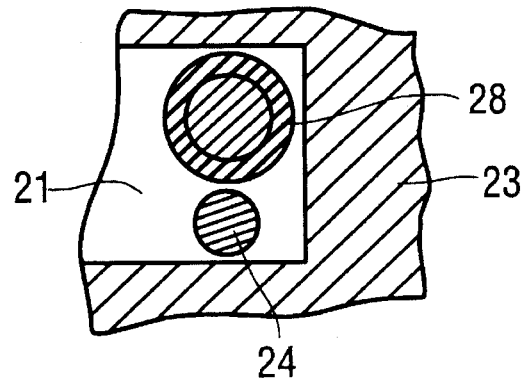
FIG. 12 is a sectional view along A–A' line in FIG. 3.

A focus limiter driving switch 13 is equipped on the outer stationary ring 22, as shown in FIG. 1. The focus limiter driving switch 13, in the circumferential direction, is a type of self-back switch, and can be moved from the central position toward either INF or NEAR, automatically returning to the central position when released (as shown in FIG. 11).

As shown in FIG. 2, a motor 11 and a motor control circuit 14 are equipped in the lens unit L. The motor 11 causes the focus limiter ring 12 to be rotated about the optical axis. The motor drive control circuit 14 causes the motor 11 to be driven while the switch 13 is turned ON. In FIG. 3, the circuit 14 causes the motor 11 to be driven clockwise while the switch 13 is moved toward NEAR. On the contrary, the circuit 14 causes the motor 11 to be driven counterclockwise while the switch 13 is moved toward INF.

DRIVING SOURCE

Figure 6:
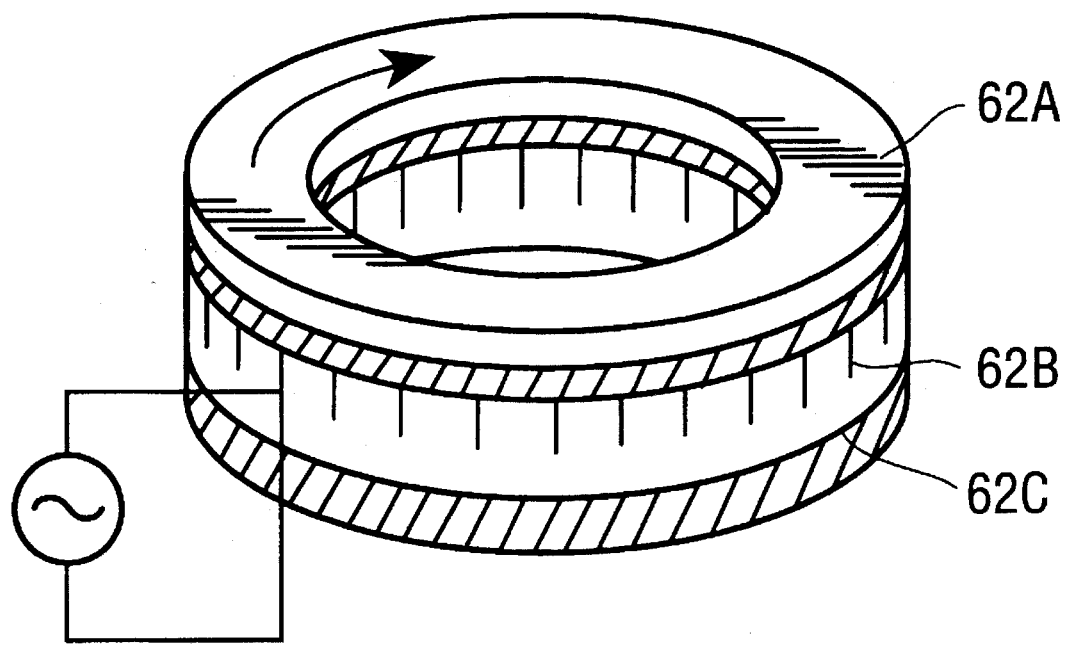
FIG. 6 is a perspective view of the drive device, as shown in FIG. 5.

FIG. 6 shows an ultrasonic motor 62 as one driving source for rotating the focus limiter ring 12 about the optical axis.

The ultrasonic motor 62 consists mainly of a rotator 62A, an elastic ring 62B, and a piezoelectric element 62C. When an AC voltage having a predetermined frequency is fed to the piezoelectric element 62C, an ultrasonic vibration occurs at the elastic ring 62B. As a result of the vibration, a rotating force is applied to the rotator 62A.

As shown in FIG. 5, the rotator 62A of the ultrasonic motor 62 is connected to the proximal end of the focus limiter ring 12 in any conventional fashion. Therefore, the focus limiter 12 will be rotated by the rotating force of the rotator 62A.

FIG. 7 shows a pulse motor as another driving source. The pulse motor 47 employs principles of operation that are well-known, and thus are not described in detail here. A rotator (not shown) of the pulse motor 47 rotates according to the number of pulses received by the pulse motor 47 from the motor control circuit 14. A pinion 48 is connected to a shaft of the pulse motor 47. An inner gear 49 is formed on the inner circumferential surface of the end portion of the focus limiter 12. The inner gear 49 meshes with the pinion 48. Therefore, an operation of the pulse motor 47 will cause the pinion 48 to be rotated, and therefore the focus limiter ring 12 will be rotated about the optical axis upon rotation of the pinion 48.

DETECTION DEVICE

Figure 8:
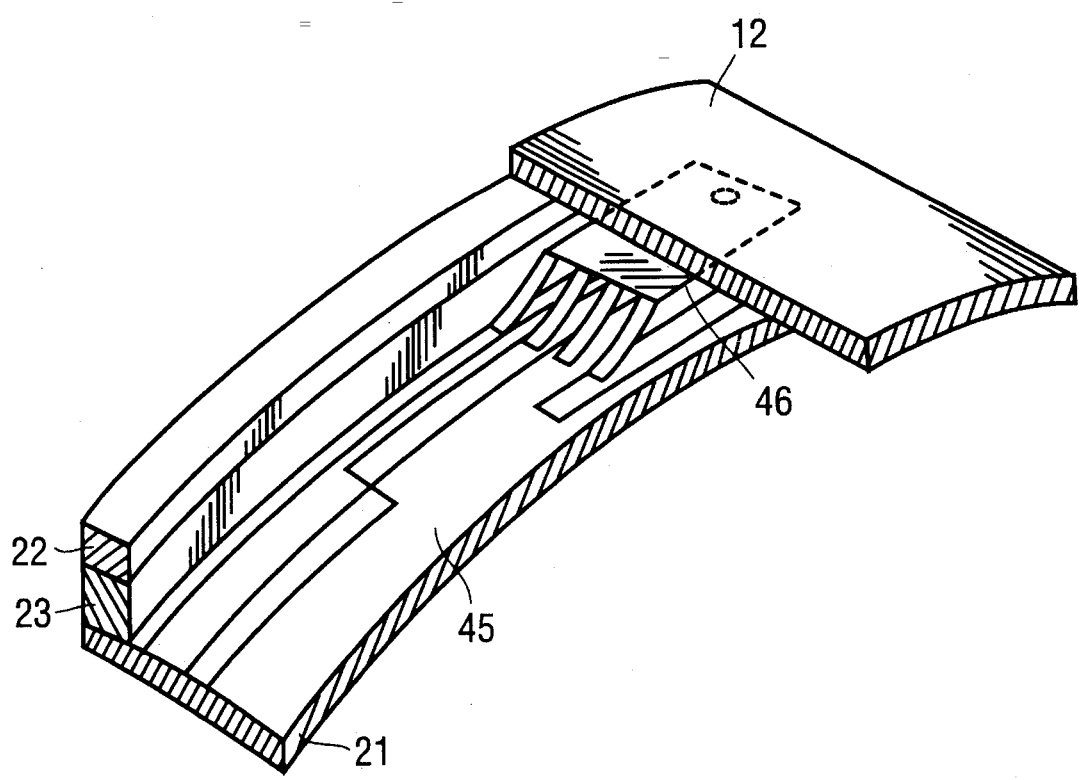
FIG. 8 is a partial perspective view of the detection unit, as shown in FIG. 5.

FIGS. 5 and 8 show a detection unit for detecting the focusing range presently set, of absolute type. The detection unit of absolute type is provided with a code plate 45 and a brush 46. The code plate 45 is provided in the circumferential direction and on the outer surface of the inner stationary ring 21. The brush 46 is attached to the inner surface of the focus limiter ring 12. The brush 46 slidably contacts the code plate 45. The code plate 45 has a different pattern depending where in the circumferential direction and on the surface of the inner stationary ring 21 it is. Therefore the signal, generated by the contact of the brush and the code plate, relating to the focusing range presently set, will change according to the changing pattern of the code plate. Thus, the focusing range presently set can be determined.

FIG. 7 shows the other detection unit of an incremental type. The incremental type of detecting unit consists mainly of a photocoupler 50, a pattern 51 which has alternating black and white stripes, and a counter (not shown) for incrementally counting pulses which are generated from the photocoupler 50.

The pattern 51 is provided in the circumferential direction and on the inner surface of the focus limiter ring 12. The photocoupler 50 is attached to the outer surface of the inner stationary ring 21.

When the focus limiter ring 12 is rotated, a number of pulses, according to an rotational amount of the focus limiter ring 12, will be generated from the photocoupler 50, and transmitted to the counter. Thus, the focusing range presently set can be determined.

DISPLAY DEVICE

Figure 9:
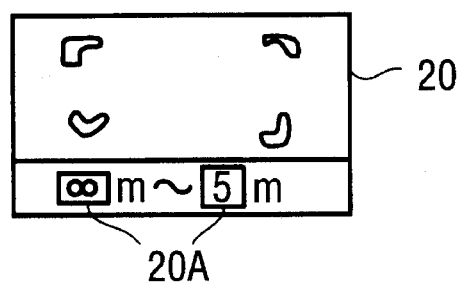
FIG. 9 is a front view illustrating a finder display in the viewfinder.

FIG. 9 shows a viewfinder, with a finder display 20A which displays the focusing range presently set. The finder display 20A is provided in the lower portion of the viewfinder 20, and electrically connected with a finder display circuit 19. The finder display circuit 19 is electrically connected to the detection unit 16. Based on the signal generated from the detecting unit 16, a value of the focusing range presently set is displayed in the finder display 20A. For example, in FIG. 9, the focusing range presently set is a range from infinity to five meters.

Figure 10:
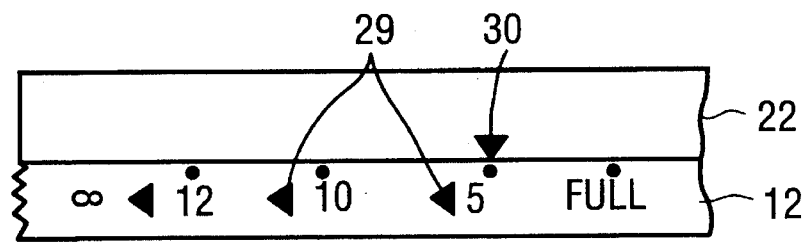
FIG. 10 is a developed view of the focus limiter ring, as shown in FIG. 1.

Therefore, it is not necessary to look at the area where an indicator 30 and a focusing scale 29 are written on the outer stationary ring 22 and the focus limiter 12 (see FIG. 10), respectively, while adjusting the focusing range. That is, the operator can confirm whether the focusing range presently set is in the desired range without moving his eye from the viewfinder, and thus not miss any photographic opportunities.

The present disclosure relates to subject matters contained in Japanese Patent Application No. HEI 4-40352 (filed on Jan. 30, 1992) which is expressly incorporated herein by reference in its entirety.

What is claimed is:

1. A lens unit, comprising:

a focus ring for moving a focus lens along an optical axis, upon rotation of the focus ring about said optical axis, within a predetermined focusing range defined between a near end and a far end;

a focus-limiting system that narrows said predetermined focusing range, said focus-limiting system including a focus limiting member to which said focus ring is contacted to thereby stop a rotation of said focus ring, said focus limiting member comprising:

a first pin which is capable of contacting one portion of said focus ring, thereby limiting one side of said focusing range; and a second pin which is capable of contacting a second portion of said focus ring, thereby limiting a second side of said focusing range;

a driving source for moving said focus limiting member;

an actuating system that includes an operation switch that actuates said driving source to move said focus limiting member when said operation switch is turned ON;

an inner stationary ring arranged in an inner periphery of said focus ring; and an outer stationary ring arranged on an outer periphery of said focus ring, wherein said focus ring is rotatable between said inner stationary ring and said outer stationary ring.

2. The lens unit according to claim 1, wherein said second pin is attached to said inner stationary ring.

3. The lens unit according to claim 2, wherein said outer stationary ring is provided with a first cut-off portion through which said first and second pins are inserted, and said focus ring is provided with a second cut-off portion which is communicating with said first cut-off portion and through which said first and second pins are inserted.

4. The lens unit according to claim 3, wherein said one portion of said focus ring is defined by one side edge of said second cut-off portion, and said other portion of said focus ring is defined by the other side edge of said second cut-off portion.

\* \* \* \* \*